United States Patent
Koo et al.

(10) Patent No.: US 12,431,137 B2
(45) Date of Patent: Sep. 30, 2025

(54) METHOD OF DETECTING A TRANSCRIPTION ERROR IN SPEECH RECOGNITION CORPUS AND DEVICE FOR THE SAME

(71) Applicant: SOGANG UNIVERSITY RESEARCH & BUSINESS DEVELOPMENT FOUNDATION, Seoul (KR)

(72) Inventors: Myoung Wan Koo, Seoul (KR); Jeong Pil Lee, Seoul (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 142 days.

(21) Appl. No.: 18/532,770

(22) Filed: Dec. 7, 2023

(65) Prior Publication Data

US 2024/0194203 A1 Jun. 13, 2024

(30) Foreign Application Priority Data

Dec. 12, 2022 (KR) .......................... 10-2022-0173084

(51) Int. Cl.
*G10L 15/26* (2006.01)
*G10L 15/01* (2013.01)
*G10L 15/22* (2006.01)

(52) U.S. Cl.
CPC .............. *G10L 15/26* (2013.01); *G10L 15/01* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 2007/0239458 A1* | 10/2007 | Odell | G10L 15/26 704/E15.045 |
| 2008/0071533 A1* | 3/2008 | Cave | G10L 15/197 704/235 |
| 2023/0028897 A1* | 1/2023 | Mukhopadhyay | G06F 40/279 |

FOREIGN PATENT DOCUMENTS

| | | |
|---|---|---|
| JP | 2012177835 A | 9/2012 |
| KR | 20150092879 A | 8/2015 |

(Continued)

OTHER PUBLICATIONS

Kurata et al., Acoustic Model Training with Detecting Transcription Errors in the Training Data, Interspeech 2011.

(Continued)

*Primary Examiner* — Aneeta Yodichkas
(74) *Attorney, Agent, or Firm* — CANTOR COLBURN LLP

(57) ABSTRACT

Provided are a method and device for detecting transcription error in a speech recognition corpus. The method of detecting a transcription error in speech recognition corpus includes following steps: (a) receiving the speech recognition corpus including a speech file and a text label for the speech file; (b) performing speech recognition on the speech file of the speech recognition corpus using a speech recognition model and converting the speech recognition result into text; (c) extracting a performance evaluation index of the speech recognition model; (d) extracting a PPL(s2) for the text label and a PPL(s1) for the text using a language model; and (e) detecting a transcription error in text label of the speech recognition corpus using the extracted performance evaluation index and the PPL(s2) and PPL(s1).

8 Claims, 2 Drawing Sheets

(56) References Cited

FOREIGN PATENT DOCUMENTS

| KR | 101590724 B1 | 2/2016 |
| KR | 20210063026 A | 6/2021 |
| KR | 20210133667 A | 11/2021 |

OTHER PUBLICATIONS

Ogawa et al., ASR Error Detection and Recognition Rate Estimation Using Deep Bidirectional Recurrent Neural Networks, ICASSP 2015.

* cited by examiner

METHOD OF DETECTING A TRANSCRIPTION ERROR IN SPEECH RECOGNITION CORPUS AND DEVICE FOR THE SAME

TECHNICAL FIELD

The present invention relates to a method of detecting a transcription error in speech recognition corpus. More specifically, the present invention relates to a method which extracts a performance evaluation index of the speech recognition model, extracts the PPL of the speech recognition result and the PPL for the text label by using the language model, and automatically detects the transcription error in the speech recognition corpus using the extracted performance evaluation index and the extracted PPLs.

BACKGROUND ART

A corpus is data that collects linguistic data from various fields and inputs it so that it can be analyzed and processed by a computer. Recently, corpora are gaining importance as language learning materials in the form of big data to strengthen the language abilities of artificial intelligence models. Artificial intelligence models are mainly used in the service field and should be able to read sentences, listen to words, interpret meaning, and recognize emotions.

To achieve this goal, artificial intelligence models learn using large amounts of language data in the form of text or speech, that is, corpus data. In particular, performing machine learning in the field of natural language processing requires a corpus consisting of a large number of sentences as training data.

In addition, corpus data is widely used for language education and research, data development or dictionary compilation, and automatic verification or correction of errors in the learning process.

In this way, the corpus for training the speech recognition models includes transcription, and the transcription is labels in text format for speech file. A speech recognition model is machine-learned using the corpus containing the transcription.

However, when the speech recognition model is trained using a corpus with transcription errors, a problem arises in which the reliability of the learning results for the speech recognition model cannot be guaranteed. Therefore, in order to solve this problem, various types of research have been conducted to detect and remove errors in the training corpus for speech recognition model.

Korean Publication Patent No. 10-2021-0063026 relates to "Automatically generated video metadata inspection method and device for the same". The above-mentioned patent discloses a technology for visually representing errors in automatically generated metadata for videos.

The technology described in the patent relates to error detection based on spelling, and is difficult to apply to error detection for the labels in speech recognition corpus. Because the labels in the speech recognition corpus are transcribed as the speech was spoken, they are valid if they exactly match the pronunciation even if the spelling is incorrect.

"Acoustic Model Training with Detecting Transcription Errors in the Training Data" published by KURATA in 2011 is about research on detecting errors in speech recognition models. In the study, only classification of speech recognition results is possible.

In general, if the speech recognition result is incorrect, there are possibilities that the speech recognition model is incorrect and that the transcription label of the corpus is incorrect. Since the study ignores these points and only detects errors in speech recognition results, it cannot be considered accurate error detection.

"ASR Error Detection and Recognition Rate Estimation using Deep Bidirectional Recurrent Neural Networks" published by Ogawa in 2015 is about research on detecting errors in the labels of speech recognition corpus using an acoustic model. In the study, the errors in the labels are detected by aligning temporal information between the speech and the text. The study considered the phonetic characteristics of the speech recognition corpus, but was an error detection method that did not take into account features of the text. Because the labels are in the form of text, the error detection method that do not consider text characteristics is incomplete.

Korean Publication Patent No. 10-2015-0092879 relates to "Grammar error correction device and method based on N-gram data and language analysis". Since the labels in the speech recognition corpus represent the pronunciation as is, there are cases where it does not match the grammar. However, because the language model does not learn data that transcribes pronunciation, the language model may judge it to be an error even for labels that accurately transcribe pronunciation. Therefore, the technology described in the above-mentioned patent cannot be used for detecting transcription errors in the speech recognition corpus.

The present invention proposes a method for automatically detecting transcription errors in a speech recognition corpus using a speech recognition model and a language model.

SUMMARY OF THE INVENTION

In order to solve the above-mentioned problems, the purpose of the present invention is to provide an apparatus and method for automatically detecting transcription errors in a speech recognition corpus using a speech recognition model and a language model.

According to a first aspect of the present invention, there is provided a method of detecting a transcription error in speech recognition corpus includes following steps: (a) receiving the speech recognition corpus including a speech file and a text label for the speech file; (b) performing speech recognition on the speech file in the speech recognition corpus using a speech recognition model and converting the speech recognition result into a text; (c) extracting a performance evaluation index for the speech recognition result of the speech recognition model; (d) extracting the PPLs (Perplexities) for the text label of the speech recognition corpus and for the text according to the speech recognition result using a language model; and (e) detecting the transcription error in the text label of the speech recognition corpus using the extracted performance evaluation index and the extracted PPLs.

In the method of detecting a transcription error in speech recognition corpus according to the first aspect of the present invention, it is preferable that the step (e) includes: (e1) setting the speech recognition corpus whose performance evaluation index is greater than a preset first reference value as a primary error candidate; and (e2) detecting the transcription error for the primary error candidate using the PPL(s2) for the text label of the speech recognition corpus and the PPL(s1) for the text according to the speech recognition result.

In the method of detecting a transcription error in speech recognition corpus according to the first aspect of the present invention, it is preferable that the step (e2) includes: (e3) setting the primary error candidate in which the PPL(s2) for the text label of the speech recognition corpus is greater than the PPL(s1) for the text according to the speech recognition result as a secondary error candidate; (e4) measuring a difference between the PPL(s2) and the PPL(s1) for the secondary error candidate; (e5) detecting the secondary error candidate whose difference is greater than a preset second reference value; and (e6) determining that the detected secondary error candidate contains the transcription error.

In the method of detecting a transcription error in speech recognition corpus according to the first aspect of the present invention, it is preferable that the performance evaluation index for the speech recognition result of the speech recognition model is one or more of CER (Character Error Rate), WER (Word Error Rate), Normalized CER, and Normalized WER.

According to a second aspect of the present invention, there is provided a transcription error detection device for speech recognition corpus includes: a corpus input module that receives a speech recognition corpus including a speech file and a text label for the speech file; a speech recognition module that performs speech recognition on the speech file in the speech recognition corpus using a speech recognition model and converting the speech recognition result into a text; and a data verification module that detects a transcription error in text label of the speech recognition corpus using a performance evaluation index for the speech recognition result of the speech recognition model and PPLs obtained by a language model.

In the transcription error detection device for speech recognition corpus according to the second aspect of the present invention, it is preferable that the data verification module includes: a performance evaluation index extraction module which extracts the performance evaluation index for the speech recognition result of the speech recognition model; a PPL extraction module which extracts a PPL(s2) for the text label of the speech recognition corpus and a PPL(s1) for the text according to speech recognition result using the language model; a primary error candidate detection module that detects a speech recognition corpus whose performance evaluation index is greater than a preset first reference value and sets the detected speech recognition corpus as a primary error candidate; and an transcription error detection module that detects the transcription error in the text label of the speech recognition corpus using the PPL(s2) and PPL(s1) for the primary error candidate.

In the transcription error detection device for speech recognition corpus according to the second aspect of the present invention, it is preferable that the transcription error detection module includes: a secondary error candidate detection module that detects the primary error candidate in which the PPL(s2) for the text label of the speech recognition corpus is greater than the PPL(s1) for the text according to the speech recognition result, and sets the detected primary error candidate as a secondary error candidate; a difference measurement module that measures difference between the PPL(s2) for the text label of the speech recognition corpus and the PPL(s1) for the text according to the speech recognition result, for the secondary error candidate; and a final error candidate detection module that detects the secondary error candidate whose difference between the PPL(s2) and the PPL(s1) is greater than a preset second reference value and determines that the detected secondary error candidate contains a transcription error.

In the transcription error detection device for speech recognition corpus according to the second aspect of the present invention, it is preferable that the performance evaluation index for the speech recognition result of the speech recognition model is one or more of CER (Character Error Rate), WER (Word Error Rate), Normalized CER, and Normalized WER.

The apparatus and method for detecting transcription error in a speech recognition corpus according to the present invention can automatically detect the transcription error in the text label of a speech recognition corpus using a speech recognition model and a language model. It can be confirmed that the device and method according to the present invention can reduce the human effort required to inspect a large speech recognition corpus and construct more accurate verification data.

DETAILED DESCRIPTION

Hereinafter, an apparatus and method for detecting a transcription error in a speech recognition corpus according to a preferred embodiment of the present invention will be described in detail with reference to the attached drawings.

Figure 1:
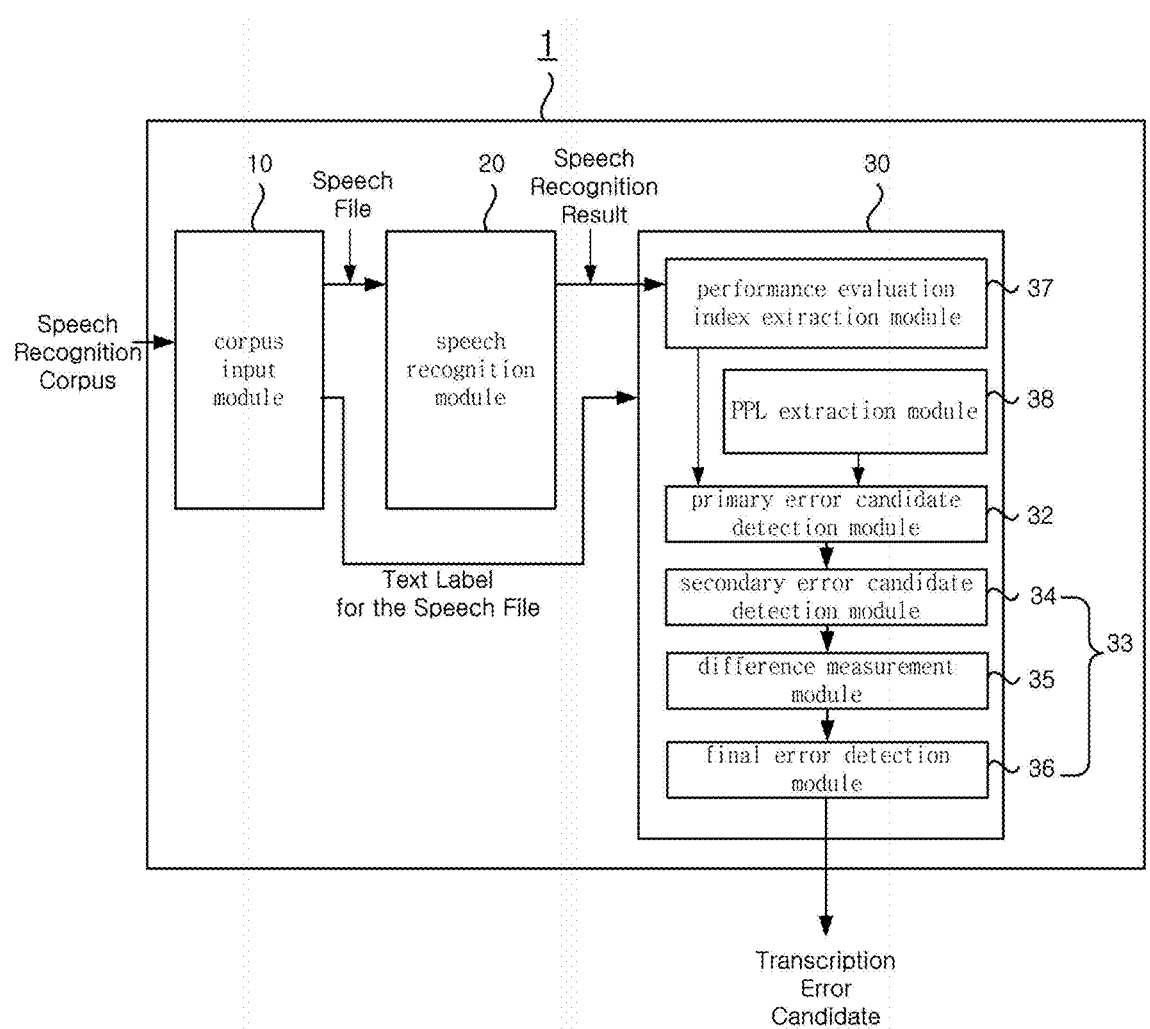
FIG. 1 is a schematic diagram showing the configuration of a transcription error detection device for a speech recognition corpus according to a preferred embodiment of the present invention.

FIG. 1 is a schematic diagram showing the configuration of the transcription error detection device for a speech recognition corpus according to a preferred embodiment of the present invention. Referring to FIG. 1, the transcription error detection device 1 according to the present invention includes a corpus input module 10, a speech recognition module 20, and a data verification module 30. The transcription error detection device automatically detects and outputs a transcription error candidate containing errors in text labels of the speech recognition corpus.

The corpus input module 10 receives a speech recognition corpus consisting of a speech file and a text label for the speech file. The corpus input module 10 provides the speech file to the speech recognition module 20 and provides the text label for the speech file to the data verification module 30.

The speech recognition module 20 includes a pre-trained speech recognition model. The speech recognition module 20 receives the speech file of the speech recognition corpus from the corpus input module 10, performs speech recognition on the speech file, converts the speech recognition result into text, and outputs the text to the data verification module 30. Generally, one speech file consists of one sentence.

The data verification module 30 includes a performance evaluation index extraction module 37, a PPL extraction module 38, a primary error candidate detection module 32 and a transcription error detection module 33. The data verification module 30 receives the text label of the speech recognition corpus from the corpus input module, and receives the text according to the speech recognition result for the speech file of the speech recognition corpus from the speech recognition module. The data verification module 30 extracts a performance evaluation index for the speech recognition result of the speech recognition model and detects the transcription error in text label of the speech recognition corpus using the extracted performance evaluation index and the extracted PPLs (Perplexity) by the language model.

The performance evaluation index extraction module 37 extracts the performance evaluation index for the speech recognition result of the speech recognition model. The primary error candidate detection module 32 detects a speech recognition corpus whose performance evaluation index is greater than a preset first reference value ($\alpha$) and sets the detected speech recognition corpus as a primary error candidate.

The performance evaluation index for the speech recognition result of the speech recognition model may use one or two of CER (Character Error Rate), WER (Word Error Rate), Normalized CER, and Normalized WER. Here, Normalized CER and Normalized WER are values obtained by normalizing CER and WER to the length of the sentence, respectively. The lower the WER and CER, the better the speech recognition performance. Therefore, if these values of the performance evaluation index are greater than the average value of the speech recognition model, an error in the data can be suspected. Therefore, in the present invention, when WER or CER is greater than the preset first reference value, it is set as a primary error candidate. Additionally, if the WER or CER is lower than the first reference value, it is determined that the performance of speech recognition and the similarity between the recognized text and the text label are high. Therefore, if WER or CER is lower than the first reference value, it is not set as an error candidate.

The PPL extraction module 38 extracts a PPL(s2) for the text label of the speech recognition corpus and a PPL(s1) for the text according to speech recognition result using the language model.

The transcription error detection module 33 extracts PPLs for the primary error candidate using a language model and detects transcription error in the primary error candidate using the extracted PPLs. The transcription error detection module 33 may include a secondary error candidate detection module 34, a difference measurement module 35 and a final error candidate detection module 36.

The language model receives text as input and outputs the probability value of the word sequence. Equation 1 is a formula for calculating the probability of the word sequence in the language model.

$$P(W) = \qquad \text{[Equation 1]}$$

$$P(w_1, w_2, w_3, w_4, w_5, \ldots w_n) = \prod_{i=1}^{n} P(w_i | w_1, \ldots, w_{i-1})$$

Therefore, the PPL(s1) for the text according to the speech recognition result is expected to be higher than the PPL(s2) for the text label of the corpus because the PPL(s1) of the speech recognition result contains errors of the speech recognition result. The present invention was completed by using these characteristics. The language model probabilistically represents words that appear continuously in text data, and is used to obtain PPL for the text according to the speech recognition results.

Perplexity (hereinafter referred to as 'PPL') is a performance measurement index of the language model and indicates the degree of generality that the input text has in the language model. PPL can be expressed as Equation 2. PPL is a value obtained by normalizing the probability for text data (i.e., word sequence) by the length of the sentence (i.e., number of words (N)). Minimizing PPL maximizes the probability of a sentence. Therefore, a low PPL means that text data has high accuracy.

$$PPL(W) = \qquad \text{[Equation 2]}$$

$$P(w_1, w_2, w_3, \ldots, w_N)^{-\frac{1}{N}} = \sqrt[N]{\frac{1}{P(w_1, w_2, w_3, \ldots, w_N)}}$$

The secondary error candidate detection module 34 detects the primary error candidate in which the PPL(s2) for the text label of the speech recognition corpus is greater than the PPL(s1) for the text according to the speech recognition result, and sets the detected primary error candidate as a secondary error candidate.

In general, the fact that the PPL for the text label is higher than the PPL for the text of the speech recognition result means that the words in the text label have low generality in the language model and the relationship between words has a relatively low probability. Also, if the PPL for the text label is higher than the PPL for the text of the speech recognition result, which may contain errors, it can be suspected that there is a transcription error in the text label.

The difference measurement module 35 measures difference between the PPL(s2) for the text label of the speech recognition corpus and the PPL(s1) for the text according to the speech recognition result, for the secondary error candidate.

The final error candidate detection module 36 detects the secondary error candidate whose difference in PPL is greater than a preset second reference value ($\beta$) and determines that the detected secondary error candidate contains a transcription error. Therefore, if the detected difference for the secondary error candidate is greater than the preset second reference value ($\beta$), the final error candidate detection module 36 finally determines the corresponding speech recognition corpus as the transcription error candidate and outputs it.

Hereinafter, a method for detecting transcription errors in a speech recognition corpus in the transcription error detection device according to the present invention having the above-described configuration will be described in detail.

Figure 2:
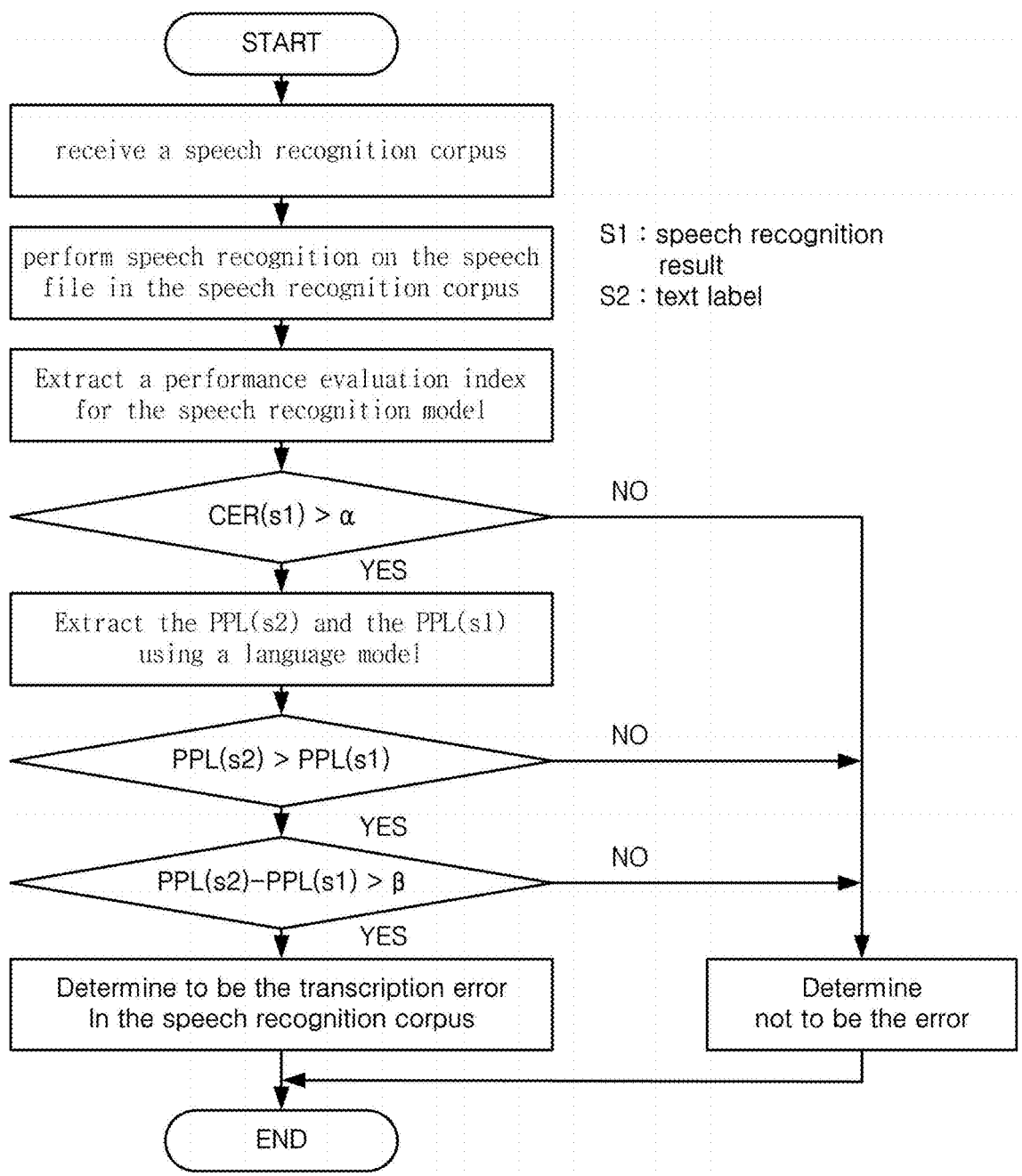
FIG. 2 is a flowchart sequentially showing the method for detecting transcription error in the speech recognition corpus by the transcription error detection device according to the preferred embodiment the present invention.

FIG. 2 is a flowchart sequentially showing the method for detecting transcription errors in the speech recognition corpus by the transcription error detection device according to the present invention.

Referring to FIG. 2, the method for detecting transcription error in a speech recognition corpus according to the present invention first receives a speech recognition corpus including a speech file and a text label for the speech file. Next, the speech file in the speech recognition corpus is performed speech recognition by using a speech recognition model, and the result (s1) of speech recognition for the speech file is converted into text. Next, a performance evaluation index for the speech recognition results of the speech recognition model is extracted. Next, if the performance evaluation index is greater than the preset first reference value, it is set as a primary error candidate.

Next, for the primary error candidate, the PPL for the text according to the speech recognition result (s1) (hereinafter referred to as 'PPL(s1)') and the PPL for the text label (s2) of the speech recognition corpus (hereinafter referred to as 'PPL(s2)') are extracted by using the language model. Next, if the PPL(s2) for the text label of the speech recognition corpus is greater than the PPL(s1) for the text according to the speech recognition result, the primary error candidate is set as a secondary error candidate. Next, for the secondary error candidate, the difference between the PPL(s2) for the text label of the speech recognition corpus and the PPL(s1) for the text according to the speech recognition result is measured. Next, the secondary error candidate whose difference is greater than a preset second reference value is detected, and it is finally determined that the detected secondary error candidate contains a transcription error.

Hereinafter, the performance of the method for detecting transcription errors in the speech recognition corpus according to the present invention described above was confirmed through experiment.

First, for the experiment to check performance, the corpus used in the present invention is KsponSpeech. KsponSpeech is a data set that can be considered a benchmark of the Korean speech recognition corpus. The entire data of KsponSpeech was used to train the speech recognition model, and verification data provided separately from this corpus was used as verification data. The Conformer-CTC model was used as a speech recognition model. Conformer-CTC was trained using KsponSpeech and used as a speech recognition model in the present invention. Then, the primary error candidates are extracted using the trained speech recognition model.

At this time, the first reference value (α) was set to 0.02. If the CER of the speech recognition result was greater than 0.02, it was judged to be a primary error candidate. This method can detect cases where the quality of speech recognition results deteriorates due to errors in labels of training data.

The final error candidates were extracted using a language model. Among the primary error candidates, if the PPL(s2) for the text label was greater than the PPL(s1) for the text of the speech recognition result, it was detected as secondary error candidate. And, among the secondary error candidates, if the difference between the PPL(s2) for the text label and the PPL(s1) for the text was greater than or equal to the second reference value (β), the corresponding secondary error candidate was detected as the final error candidate. The second reference value (β) was set to 0.15.

The effectiveness of the data verification module of the transcription error detection device according to the present invention was verified as follows. The degree of overlap between the label judged to be an error by a person and the label judged to be an error by the device according to the present invention was measured. The verification data is eval_clean in KsponSpeech, and the total number of data is 3000. For this data, a person directly listened to the speech file and checked whether the text label of the speech file was correct.

First, for the first quantitative evaluation, the ratio of labels that humans also judged to be errors among the labels that the data verification module judged to be errors was measured. In other words, the percentage of correct answers is measured as shown in Equation 3.

$$\frac{\text{number of errors deteced by machine and human}}{\text{number of errors machine detected}} \times 100 \quad \text{[Equation 3]}$$

The performance achieved a detection accuracy of 83.15% for CER Threshold (α)=0.02 and PPL difference threshold (β)=0.15. Here, the number of data that the model judged to be an error was 178, the number of data that the human judged to be an error was 536, and the number of data that the model and human judged to be an error was 148. Therefore, the accuracy is 148/178*100=83.15%.

Next, for the second quantitative evaluation, the label judged to be an error was corrected and the CER was measured again.

If the CER is lowered when the label of the verification data is modified for the same speech recognition result, it can be considered that more accurate verification data has been constructed. The CER for each stage is shown in the table below.

| verification data | CER(%) |
|---|---|
| Original data before modification | 9.4% |
| After modifying the label that the module determines to be an error | 8.9% |
| After modifying the label that the person determines to be an error | 8.5% |

This table shows that the CER when modifying the label that the module judged to be an error was lower compared to the original. In addition, it was confirmed that there was a speech recognition error rate due to the label, and that this could be corrected through the data verification module.

In addition, if the CER improved from 9.4% to 8.5% when all 3,000 pieces of data were examined by humans, the CER improved from 9.4% to 8.9% when 178 pieces of suspicious data were corrected through the model, and the number of data that people actually had to see was reduced to 178/3000*100=5.93%. From this, it can be confirmed that the device and method according to the present invention can reduce the human effort required to inspect a large speech recognition corpus and construct more accurate verification data.

In the above, the present invention has been described with respect to the preferred embodiment thereof, but this is only an example and does not limit the present invention. It will be appreciated that various modifications and applications not exemplified above are possible within the scope of the present invention. In addition, the differences related to such modifications and applications should be construed as being included in the scope of the present invention defined in the appended claims.

What is claimed is:

1. A method of detecting a transcription error in speech recognition corpus includes following steps:
    (a) receiving the speech recognition corpus including a speech file and a text label for the speech file;
    (b) performing speech recognition on the speech file in the speech recognition corpus using a speech recognition model and converting the speech recognition result into a text;
    (c) extracting a performance evaluation index for the speech recognition result of the speech recognition model;

(d) extracting a PPL(s2) for the text label of the speech recognition corpus and a PPL(s1) for the text according to the speech recognition result using a language model; and (e) detecting the transcription error in the text label of the speech recognition corpus using the extracted performance evaluation index and the extracted PPL(s2) and PPL(s1).

2. The method of detecting the transcription error in speech recognition corpus according to claim 1, wherein the step (e) includes:

(e1) setting the speech recognition corpus whose performance evaluation index is greater than a preset first reference value as a primary error candidate; and (e2) detecting the transcription error for the primary error candidate using the PPL(s2) for the text label of the speech recognition corpus and the PPL(s1) for the text according to the speech recognition result.

3. The method of detecting the transcription error in speech recognition corpus according to claim 2, wherein the step (e2) includes:

(e3) setting the primary error candidate in which the PPL(s2) for the text label of the speech recognition corpus is greater than the PPL(s1) for the text according to the speech recognition result as a secondary error candidate;

(e4) measuring a difference between the PPL(s2) and the PPL(s1) for the secondary error candidate; and (e5) detecting the secondary error candidate whose difference is greater than a preset second reference value, and determining that the detected secondary error candidate contains the transcription error.

4. The method of detecting the transcription error in speech recognition corpus according to claim 1, wherein the performance evaluation index for the speech recognition result of the speech recognition model is one or more of CER (Character Error Rate), WER (Word Error Rate), Normalized CER, and Normalized WER.

5. A transcription error detection device for speech recognition corpus includes:

a corpus input module that receives a speech recognition corpus including a speech file and a text label for the speech file;

a speech recognition module that performs speech recognition on the speech file of the speech recognition corpus using a speech recognition model and converts the speech recognition result into a text;

a data verification module that detects a transcription error in text label of the speech recognition corpus using a performance evaluation index for the speech recognition model and PPLs obtained by a language model.

6. The Transcription error detection device for speech recognition corpus according to claim 5, wherein the data verification module includes;

a performance evaluation index extraction module which extracts the performance evaluation index for the speech recognition result of the speech recognition model;

a PPL extraction module which extracts a PPL(s2) for the text label of the speech recognition corpus and a PPL(s1) for the text according to speech recognition result using the language model;

a primary error candidate detection module that detects a speech recognition corpus whose performance evaluation index is greater than a preset first reference value and sets the detected speech recognition corpus as a primary error candidate; and a transcription error detection module that detects the transcription error in the text label of the speech recognition corpus using the PPL(s2) and PPL(s1) for the primary error candidate.

7. The Transcription error detection device for speech recognition corpus according to claim 6, wherein the transcription error detection module includes;

a secondary error candidate detection module that detects the primary error candidate in which the PPL(s2) of the text label of the speech recognition corpus is greater than the PPL(s1) of the text according to the speech recognition result, and sets the detected primary error candidate as a secondary error candidate;

a difference measurement module that measures difference between the PPL(s2) for the text label of the speech recognition corpus and the PPL(s1) for the text according to the speech recognition result, for the secondary error candidate; and a final error candidate detection module that detects the secondary error candidate whose difference between the PPL(s2) and the PPL(s1) is greater than a preset second reference value and determines that the detected secondary error candidate contains a transcription error.

8. The Transcription error detection device for speech recognition corpus according to claim 5, wherein the performance evaluation index for the speech recognition result of the speech recognition model is one or more of CER (Character Error Rate), WER (Word Error Rate), Normalized CER, and Normalized WER.

* * * * *